(12) United States Patent
Huang et al.

(10) Patent No.: US 10,904,580 B2
(45) Date of Patent: Jan. 26, 2021

(54) METHODS AND APPARATUSES OF VIDEO DATA PROCESSING WITH CONDITIONALLY QUANTIZATION PARAMETER INFORMATION SIGNALING

(71) Applicant: MEDIATEK INC., Hsin-Chu (TW)

(72) Inventors: Han Huang, San Jose, CA (US); Ching-Yeh Chen, Taipei (TW); Shan Liu, San Jose, CA (US); Xiaozhong Xu, State College, PA (US); Tzu-Der Chuang, Zhubei (TW); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 231 days.

(21) Appl. No.: 16/304,203

(22) PCT Filed: May 27, 2017

(86) PCT No.: PCT/CN2017/086267
§ 371 (c)(1),
(2) Date: Nov. 23, 2018

(87) PCT Pub. No.: WO2017/206826
PCT Pub. Date: Dec. 7, 2017

(65) Prior Publication Data
US 2020/0322602 A1    Oct. 8, 2020

Related U.S. Application Data

(60) Provisional application No. 62/343,042, filed on May 30, 2016, provisional application No. 62/342,884, filed on May 28, 2016.

(30) Foreign Application Priority Data

Jun. 24, 2016   (WO) ................ PCT/CN2016/087005

(51) Int. Cl.
*H04N 19/96* (2014.01)
*H04N 19/119* (2014.01)
(Continued)

(52) U.S. Cl.
CPC ........... *H04N 19/96* (2014.11); *H04N 19/119* (2014.11); *H04N 19/124* (2014.11);
(Continued)

(58) Field of Classification Search
None
See application file for complete search history.

(56) References Cited

U.S. PATENT DOCUMENTS 9,462,275 B2    10/2016   Guo et al.
9,571,829 B2    2/2017    Yang et al.
(Continued)

FOREIGN PATENT DOCUMENTS

CN    102685478 A    9/2012
CN    102801976 A    11/2012
(Continued)

OTHER PUBLICATIONS

International Search Report dated Sep. 4, 2017, issued in application No. PCT/CN2017/086267.
(Continued)

*Primary Examiner* — Jayanti K Patel
*Assistant Examiner* — Stefan Gadomski
(74) *Attorney, Agent, or Firm* — McClure, Qualey & Rodack, LLP

(57) ABSTRACT

Processing methods and apparatuses for video data of a color component comprise receiving input data associated with a current coding block (CB) in a current slice, where the video data is partitioned into multiple CBs according to a partitioning method. A Quantization Parameter (QP) minimum block area or a depth flag is determined and an area of
(Continued)

the current CB according to a width and a height or a combined depth of the current CB is calculated and compared with the QP minimum block area or the depth flag. Signaling of QP information for the current CB is conditioned by the comparing result. The QP information for the current CB is used to quantize a residual signal of the current CB or recovering a quantized residual signal of the current CB.

13 Claims, 11 Drawing Sheets

(51) Int. Cl.
    *H04N 19/174*     (2014.01)
    *H04N 19/176*     (2014.01)
    *H04N 19/186*     (2014.01)
    *H04N 19/46*     (2014.01)
    *H04N 19/124*     (2014.01)

(52) U.S. Cl.
    CPC ......... *H04N 19/174* (2014.11); *H04N 19/176* (2014.11); *H04N 19/186* (2014.11); *H04N 19/46* (2014.11)

(56) References Cited

U.S. PATENT DOCUMENTS

| | | | |
|---|---|---|---|
| 10,045,025 B2 | 8/2018 | Lee | |
| 2010/0295922 A1* | 11/2010 | Cheung | H04N 19/61 348/42 |
| 2012/0114034 A1 | 5/2012 | Huang et al. | |
| 2012/0328192 A1* | 12/2012 | Fukuhara | H04N 19/124 382/166 |
| 2013/0003855 A1 | 1/2013 | Park et al. | |
| 2013/0022111 A1* | 1/2013 | Chen | H04N 19/46 375/240.12 |
| 2013/0195199 A1 | 8/2013 | Guo et al. | |
| 2013/0293565 A1* | 11/2013 | Arvo | H04N 1/64 345/589 |
| 2014/0205007 A1* | 7/2014 | Takahashi | H04N 19/50 375/240.03 |
| 2014/0253682 A1* | 9/2014 | Zhang | H04N 19/597 348/43 |
| 2014/0307787 A1* | 10/2014 | Zheng | H04N 19/176 375/240.12 |
| 2014/0321561 A1* | 10/2014 | Stec | H04N 19/134 375/240.29 |
| 2015/0010049 A1* | 1/2015 | Zhang | H04N 19/597 375/240.02 |
| 2015/0043636 A1* | 2/2015 | Jung | H04N 19/59 375/240.12 |
| 2015/0049807 A1* | 2/2015 | Gu | H04N 19/63 375/240.15 |
| 2015/0117519 A1* | 4/2015 | Kim | H04N 19/146 375/240.02 |
| 2015/0237324 A1* | 8/2015 | Zhang | H04N 13/15 375/240.24 |
| 2016/0029038 A1* | 1/2016 | Zhao | H04N 19/597 375/240.12 |
| 2016/0050419 A1* | 2/2016 | Zhao | H04N 19/176 375/240.12 |
| 2016/0057417 A1* | 2/2016 | Kawamura | H04N 19/597 375/240.12 |
| 2016/0205403 A1 | 7/2016 | Huang et al. | |
| 2017/0134749 A1* | 5/2017 | Park | H04N 19/597 |
| 2017/0150178 A1* | 5/2017 | Nam | H04N 19/17 |
| 2017/0164003 A1* | 6/2017 | Lee | H04N 13/271 |
| 2017/0164004 A1* | 6/2017 | Lee | H04N 19/176 |

FOREIGN PATENT DOCUMENTS

| | | |
|---|---|---|
| CN | 103210647 A | 7/2013 |
| CN | 104081777 A | 10/2014 |
| CN | 104094600 A | 10/2014 |
| EP | 2 672 707 A1 | 12/2013 |
| EP | 2 763 415 A1 | 8/2014 |
| EP | 2 811 745 A1 | 12/2014 |
| RU | 2 566 332 A | 4/2015 |
| WO | 2012/062161 A1 | 5/2012 |
| WO | 2016/091161 A1 | 6/2016 |
| WO | 2018/019706 A1 | 1/2018 |

OTHER PUBLICATIONS

Huang, H., et al.; "EE2.1: Quadtree plus binary tree structure integration with JEM tools;" Joint Video Exploration Team (JVET) of ITU-T SG 16 WP 3 and ISO/IEC JTC 1/SC 29/WG 11; May-Jun. 2016; pp. 1-6.

Chubach, O., et al.; "On quantization parameter signalling considering CU area;" Joint Video Exploration Team (JVET) of ITU-T SG 16 WP 3 and ISO/IEC JTC 1/SC 29/WG 11; Jan. 2019; pp. 1-12.

Chinese language office action dated Jul. 30, 2020, issued in application No. CN 201780031613.3.

\* cited by examiner

MxM          M/2xM          MxM/2          M/2xM/2

M/4xM (L)    M/4xM (R)      MxM/4 (U)      MxM/4 (D)

M/2xM　　　MxM/2

M/4xM (L)　　M/4xM (R)　　MxM/4 (U)　　MxM/4 (D)

METHODS AND APPARATUSES OF VIDEO DATA PROCESSING WITH CONDITIONALLY QUANTIZATION PARAMETER INFORMATION SIGNALING

CROSS REFERENCE TO RELATED APPLICATIONS

The present invention claims priority to U.S. Provisional Patent Application Ser. No. 62/342,884, filed on May 28, 2016, entitled "Methods of signaling delta QP for Quad-tree Plus binary tree structure", U.S. Provisional Patent Application Ser. No. 62/343,042, filed on May 30, 2016, entitled "Methods of signaling quantization parameter for Quad-tree Plus binary tree structure", and PCT Patent Application Serial No. PCT/CN2016/087005, filed on Jun. 24, 2016, entitled "Methods of signaling quantization parameter for Quad-tree plus binary tree structure". The U.S. Provisional Patent Applications and the PCT Patent Application are hereby incorporated by reference in their entireties.

TECHNICAL FIELD

The present invention relates to video data processing methods and apparatuses encode or decode video data. In particular, the present invention relates to video data processing methods and apparatuses encode or decode video data according to quantization parameters information conditionally signaled in a video bitstream.

BACKGROUND

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). In the HEVC main profile, the minimum and the maximum sizes of a CTU are specified by syntax elements signaled in the Sequence Parameter Set (SPS). A raster scan order is used to process the CTUs in a slice. Each CTU is further recursively divided into one or more Coding Units (CUs) using quad-tree partitioning method. The CU size is restricted to be less than or equal to a minimum allowed CU size, which is specified in the SPS. An example of the quad-tree block partitioning structure is illustrated in FIG. 1, where the solid lines indicate CU boundaries in CTU 100.

The prediction decision is made at the CU level, where each CU is coded using either Inter picture prediction or Intra picture prediction. Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU works as a basic representative block for sharing the prediction information as the same prediction process is applied to all pixels in the PU. The prediction information is conveyed to the decoder on a PU basis. After obtaining a residual signal generated by the prediction process, residual data of the residual signal belong to a CU is split into one or more Transform Units (TUs) according to another quad-tree block partitioning structure for transforming the residual data into transform coefficients for compact data representation. The dotted lines in FIG. 1 indicate TU boundaries. The TU is a basic representative block for applying transform and quantization on the residual signal. For each TU, a transform matrix having the same size as the TU is applied to the residual signal to generate the transform coefficients, and these transform coefficients are quantized and conveyed to the decoder on a TU basis.

The terms Coding Tree Block (CTB), Coding block (CB), Prediction Block (PB), and Transform Block (TB) are defined to specify two dimensional sample array of one color component associated with the CTU, CU, PU, and TU respectively. For example, a CTU consists of one luma CTB, two chroma CTBs, and its associated syntax elements. In the HEVC system, the same quad-tree block partitioning structure is generally applied to both luma and chroma components unless a minimum size for chroma block is reached.

An alternative partitioning method is called binary-tree block partitioning method, where a block is recursively split into two smaller blocks. FIG. 3 illustrates some split types for the binary-tree partitioning method. A simplest binary-tree partitioning method only allows symmetrical horizontal splitting and symmetrical vertical splitting. For a given block with size M×N, a first flag is signaled to indicate whether this block is partitioned into two smaller blocks, followed by a second flag indicating the split type if the first flag indicates splitting. This M×N block is split into two blocks of size M×N/2 if the split type is symmetrical horizontal splitting, and this M×N block is split into two blocks of size M/2×N if the split type is symmetrical vertical splitting. The splitting process can be iterated until the size, width, or height of a splitting block reaches a minimum allowed size, width, or height. Horizontal splitting is implicitly not allowed if a block height is smaller than the minimum height, and similarly, vertical splitting is implicitly not allowed if a block width is smaller than the minimum width.

FIGS. 4A and 4B illustrate an example of block partitioning according to a binary-tree partitioning method and its corresponding coding tree structure. In FIG. 4B, one flag at each splitting node (i.e., non-leaf) of the binary-tree coding tree is used to indicate the split type, flag value equals to 0 indicates horizontal splitting while flag value equals to 1 indicates vertical splitting. It is possible to apply the binary-tree partitioning method at any level of block partitioning during encoding or decoding, for example, the binary-tree partitioning method may be used to partition a slice into CTUs, a CTU into CUs, a CU in PUs, or a CU into TUs. It is also possible to simplify the partitioning process by omitting the splitting from CU to PU and from CU to TU, as the leaf nodes of a binary-tree block partitioning structure is the basic representative block for both prediction and transform coding.

Although the binary-tree partitioning method supports more partition structures and thus is more flexible than the quad-tree partitioning method, the coding complexity increases for selecting the best partition shape among all possible shapes. A combined partitioning method called Quad-Tree-Binary-Tree (QTBT) structure combines a quad-tree partitioning method with a binary-tree partitioning method, which balances the coding efficiency and the coding complexity of the two partitioning methods. An exemplary QTBT structure is shown in FIG. 5A, where a large block is firstly partitioned by a quad-tree partitioning method then a binary-tree partitioning method. FIG. 5A illustrates an example of block partitioning structure according to the QTBT partitioning method and FIG. 5B illustrates a coding tree diagram for the QTBT block partitioning structure shown in FIG. 5A. The solid lines in FIGS. 5A and 5B indicate quad-tree splitting while the dotted lines indicate binary-tree splitting. Similar to FIG. 4B, in each splitting (i.e., non-leaf) node of the binary-tree structure, one flag indicates which splitting type (symmetric horizontal splitting or symmetric vertical splitting) is used, 0 indicates horizontal splitting and 1 indicates vertical splitting. The QTBT structure in FIG. 5A splits the large block into multiple smaller blocks, and these smaller blocks may be processed by prediction and transform coding without further splitting. In an example, the large block in FIG. 5A is a coding tree unit (CTU) with a size of 128×128, a minimum allowed quad-tree leaf node size is 16×16, a maximum allowed binary-tree root node size is 64×64, a minimum allowed binary-tree leaf node width or height is 4, and a minimum allowed binary-tree depth is 4. In this example, the leaf quad-tree block may have a size from 16×16 to 128×128, and if the leaf quad-tree block is 128×128, it cannot be further split by the binary-tree structure since the size exceeds the maximum allowed binary-tree root node size 64×64. The leaf quad-tree block is used as the root binary-tree block that has a binary-tree depth equal to 0. When the binary-tree depth reaches 4, non-splitting is implicit; when the binary-tree node has a width equal to 4, non-vertical splitting is implicit; and when the binary-tree node has a height equal to 4, non-horizontal splitting is implicit. For CTUs coded in I slice, the QTBT block partitioning structure for a chroma coding tree block (CTB) can be different from the QTBT block partitioning structure for a corresponding luma CTB. For CTUs coded in P or B slice, the same QTBT block partitioning structure may be applied to both chroma CTB and luma CTB.

Another partitioning method called triple-tree partitioning method is introduced to capture objects which locate in the block center while quad-tree partitioning method and binary-tree partitioning method always split along the block center. FIG. 6 illustrates two exemplary triple-tree partition types in the triple-tree partitioning method including horizontal center-side triple-tree partitioning 60 and vertical center-side triple-tree partitioning 62. The triple-tree partitioning method may provide capability to faster localize small objects along block boundaries, by allowing one-quarter partitioning vertically or horizontally. Since the width or height of the triple-tree partitioned blocks 602, 604, 606, 622, 624, and 626 is always a power of two, no additional transforms are required to transform these triple-tree partitioned blocks.

SUMMARY

Methods and apparatuses of processing video data in a video coding system with conditioned Quantization Parameter (QP) information signaling are disclosed. Embodiments of a video coding system receive input data associated with a current Coding Block (CB) in a current slice. Video data of a color component in the current slice is partitioned according to a partitioning method. The partitioning method may be one or more of the quad-tree, binary-tree, QTBT, and triple-tree partitioning method. In some embodiments, a quantization parameter minimum block size is determined and compared with an area of the current CB. The area of the current CB is calculated according to a width and a height of the current CB. Signaling of QP information for the current CB in the current slice is conditioned by the comparing result of areas. The QP information for the current CB is determined and incorporated in a video bitstream or the QP information for the current CB is parsed from the video bitstream if the area of the current CB is larger than or equal to the QP minimum block area. The video coding system quantizes a residual signal of the current CB or recovering a quantized residual signal of the current CB according to the QP information for the current CB.

In one embodiment, the QP information for the current CB is derived from shared QP information sharing by a group of CBs if the area of the current CB is smaller than the QP minimum block area. The group of CBs sharing the shared QP information is also called a quantization group in this disclosure. No individual QP is signaled in the video bitstream for each CB in the quantization group. The shared QP information may be incorporated in the video bitstream or parsed from the video bitstream when processing a first coded CB of the group of CBs sharing the shared QP information. The first coded CB is first processed in the group according to an encoding or decoding order that has at least a non-zero residual transform coefficient. A total area of the group of CBs sharing the shared QP information is larger than or equal to the QP minimum block area.

In some other embodiment, video data of a color component in each slice is partitioned into Coding Blocks (CBs) according to a combined partitioning method, where the combined partitioning method partitions the video data according to a first partitioning method then a second partitioning method. An example of the combined partitioning method is the QTBT partitioning method. Embodiments of the video coding system receive input data associated with a current CB in a current slice, and determines a depth flag. A combined depth for the current CB is calculated according to a first partitioning depth corresponding to the first partitioning method and a second partitioning depth corresponding to the second partitioning method. The combined depth for the current CB is compared with the depth flag and signaling of QP information for the current CB is conditioned by the comparing result of depths. QP information for the current CB is determined and incorporated in a video bitstream or parsed from the video bitstream if the combined depth of the current CB is smaller than or equal to the depth flag. The video coding system quantizes a residual signal of the current CB according to the QP information for the current CB or recovers a quantized residual signal of the current CB according to the QP information for the current CB.

In one embodiment, the combined depth is calculated according to a weighted sum of the first partitioning depth and the second partitioning depth. For example, the combined partitioning method is Quad-Tree-plus-Binary-Tree (QTBT) partitioning method, where the first partitioning depth is quad-tree depth of the current CB, the second partitioning depth is binary-tree depth of the current CB. The combined depth is calculated by adding the quad-tree depth to a half of the binary-tree depth of the current CB. The depth flag specifies a difference in depth values between a Coding Tree Block (CTB) size and a minimum block size for QP information signaling.

In some embodiments, the QP information for the current CB is derived from shared QP information sharing by a group of CBs if the combined depth of the current CB is larger than the depth flag. No individual QP information is signaled in the video bitstream for each CB in the group. The shared QP information may be incorporated in the video bitstream or parsed from the video bitstream when processing a first coded CB of the group of CBs sharing the shared QP information. The first coded CB is first coded in the group that has at least one non-zero residual transform coefficient.

Embodiments of the QP information for the current CB signaled in the video bitstream is associated with a delta QP, a QP offset, or a final QP, for example, syntax elements relating to delta QP incorporate in the video bitstream or parsed from the video bitstream include delta QP absolute value and delta QP sign flag, syntax elements relating to the QP offset include QP offset absolute value and QP offset sign flag.

In one embodiment, the color component carried in the current CB is a luminance (luma) component, and QP information for a chrominance (chroma) component are signaled separately with respect to signaling of the QP information for the luma component if block partitioning structures for the luma component and the chroma component are separately determined.

In another embodiment, the color component carried in the current CB is a chroma component, and the QP information for the current CB is determined by reusing QP information for a co-located luma block of the current CB if block partitioning structures for a luma component and the chroma component are separately determined. A reuse flag is signaled at a sequence level, picture level, or slice level to adaptively enable or disable the reuse of QP information for the co-located luma block.

A variation of the embodiments separately codes syntax elements for determining the QP minimum block area for luma and chroma components in a sequence level, picture level, or slice level. In another variation, a QP minimum block area for a chroma component is determined from a QP minimum block area for a luma component. A flag may be signaled to indicate whether the QP minimum block area for the chroma component is determined according to the same ratio as a color sampling ratio for sampling the luma and chroma components.

Aspects of the disclosure further provide an apparatus for the video coding system with adaptive quantization according to QP information conditionally signaled in a video bitstream. Embodiments of the apparatus determine a minimum QP block area and compare the minimum QP block area with an area of each CB partitioned by a partitioning method. QP information for a current CB is signaled in the video bitstream if the area of the current CB is larger than or equal to the minimum QP block area. Some other embodiments of the apparatus determine a depth flag and compare the depth flag with a combined depth of each CB partitioned by a combined partitioning method. QP information for a current CB is signaled in the video bitstream if the combined depth of the current CB is smaller than or equal to the depth flag.

Aspects of the disclosure further provide a non-transitory computer readable medium storing program instructions for causing a processing circuit of an apparatus to perform video coding process with adaptive quantization according to QP information conditionally signaled in a video bitstream. An embodiment of the video coding processing determines a minimum QP block area or depth flag, and QP information for each block partitioned by a partitioning method is conditionally signaled according to a comparing result. Other aspects and features of the invention will become apparent to those with ordinary skill in the art upon review of the following descriptions of specific embodiments.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
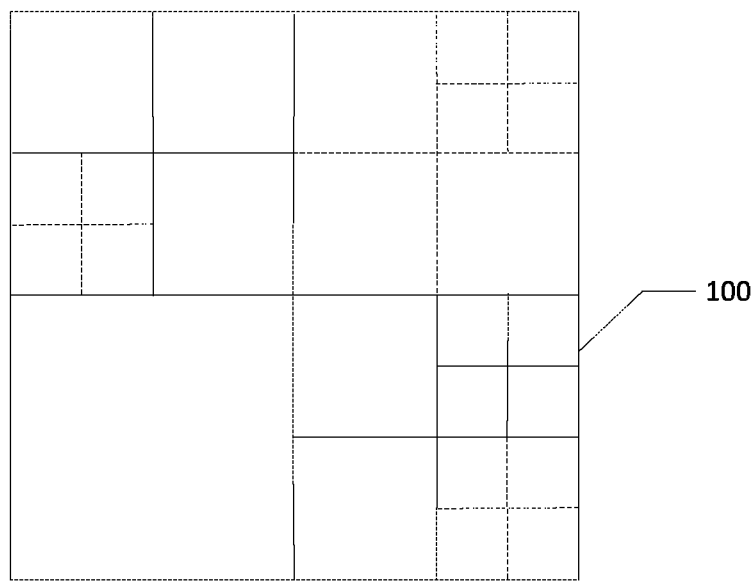
FIG. 1 illustrates an exemplary coding tree for splitting a Coding Tree Unit (CTU) into Coding Units (CUs) and splitting each CU into one or more Transform Units (TUs) in the HEVC standard.
Figure 2:
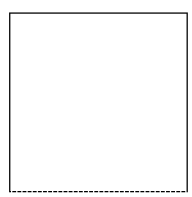
FIG. 2 illustrates eight different PU partition types splitting a CU into one or more PUs according to the HEVC standard.
Figure 2:
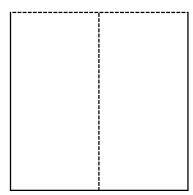
Figure 2:
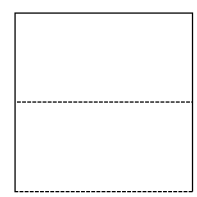
Figure 2:
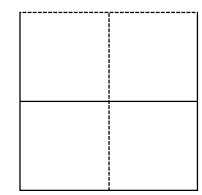
Figure 2:
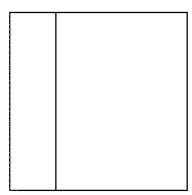
Figure 2:
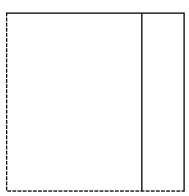
Figure 2:
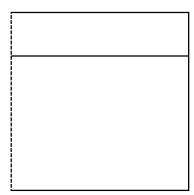
Figure 2:
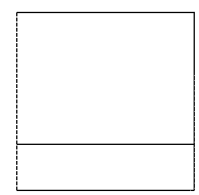
Figure 3:
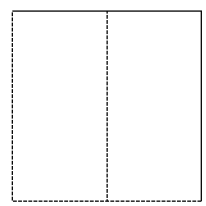
FIG. 3 illustrates six exemplary split types of a binary-tree partitioning method.
Figure 3:
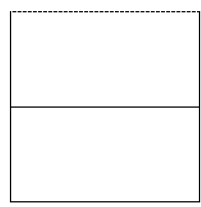
Figure 3:
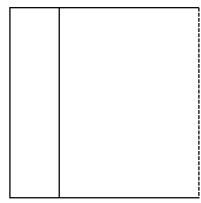
Figure 3:
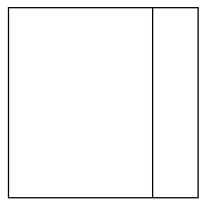
Figure 3:
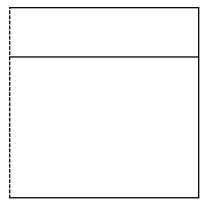
Figure 3:
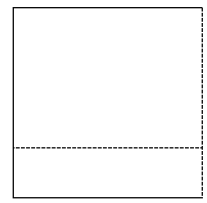
Figure 4A:
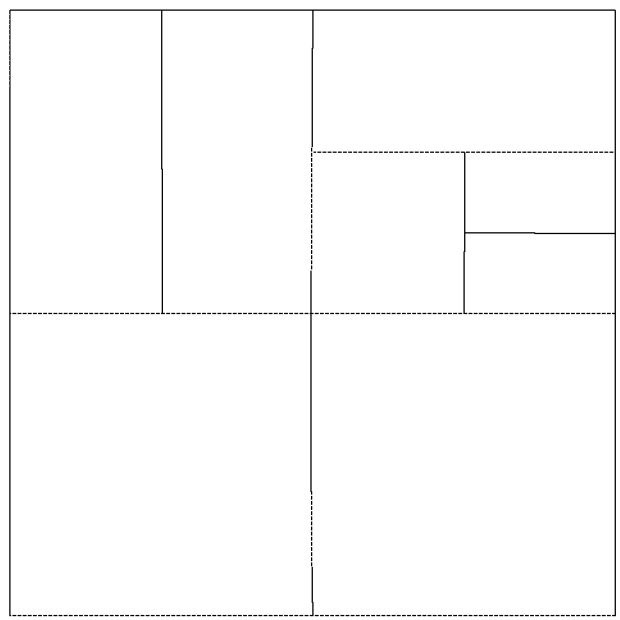
FIG. 4A illustrates an exemplary block partitioning structure according to a binary-tree partitioning method.
Figure 4B:
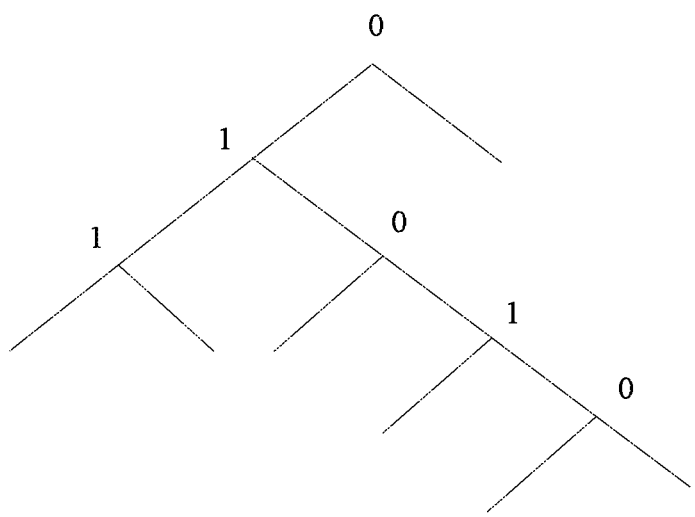
FIG. 4B illustrates a coding tree structure corresponding to the block partitioning structure shown in FIG. 4A.
Figure 5A:
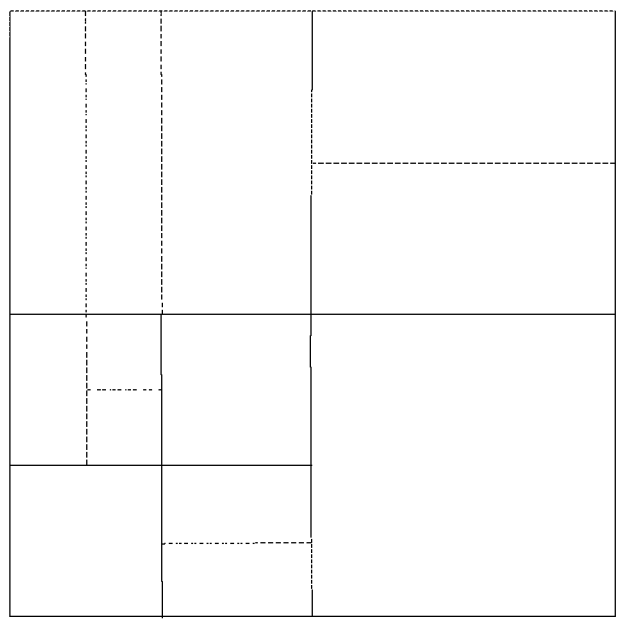
FIG. 5A illustrates an exemplary block partitioning structure according to a Quad-Tree-Binary-Tree (QTBT) partitioning method.
Figure 5B:
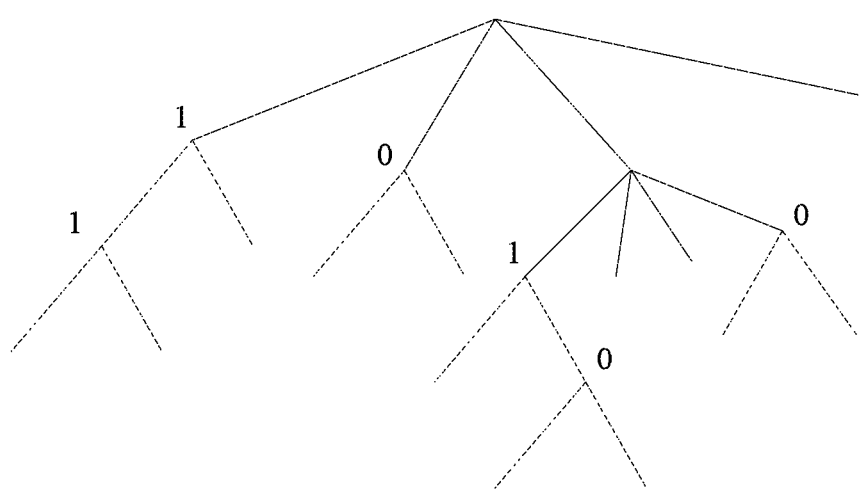
FIG. 5B illustrates a coding tree structure corresponding to the block partitioning structure of FIG. 5A.
Figure 6:
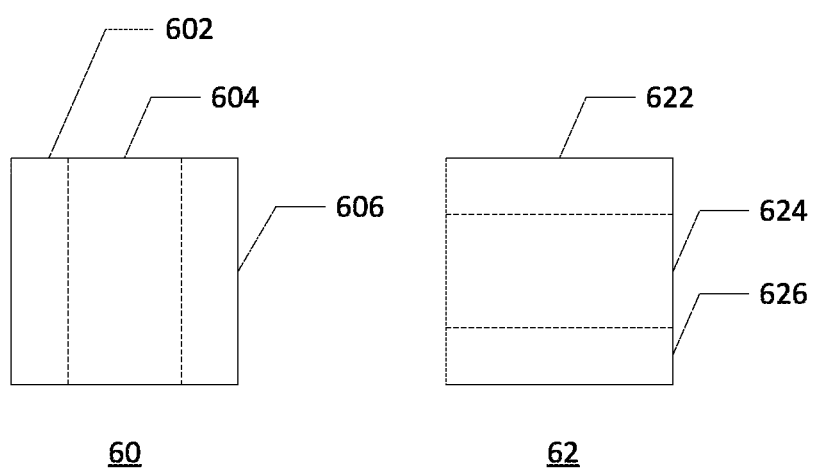
FIG. 6 illustrates two exemplary triple-tree partitioning types in a triple-tree partitioning method.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

In the HEVC standard, each Coding Block (CB) greater than or equal to a minimum block size for delta QP signaling has its own quantization parameter (QP) and QP information is conveyed to the decoder side so that the decoder will use the same QP for proper decoding process. Delta QP derived by the difference between a current coding QP and a reference QP is transmitted to reduce the bit rate required for QP information. Delta QP signaling for the luma component is controlled by two flags, cu_qp_delta_enabled_flag and diff_cu_qp_delta_depth. The enable flag, cu_qp_delta_enabled_flag, is used to indicate delta QP signaling is enabled or disabled, and the depth flag, diff_cu_qp_delta_depth, is used to set the minimum block size for delta QP signaling. The depth flag diff_cu_qp_delta_depth is presented in Picture Parameter Set (PPS) and syntax element cu_qp_delta_abs may be present in the transform unit (TU) syntax if the enable flag cu_qp_delta_enabled_flag indicates delta QP signaling is enabled. A sign flag cu_qp_delta_sign_flag may be present in the TU syntax to indicate the sign of the delta QP if cu_qp_delta_abs is present and is not zero. The depth flag diff_cu_qp_delta_depth specifies the difference in depth between a luma CTB size and the minimum luma CB size for conveying delta QP information including cu_qu_delta_abs and cu_qp_delta_sign_flag. The decoder determines the minimum block size for delta QP signaling from the luma CTB size according to the depth flag. The value of this depth flag diff_cu_qp_delta_depth is set in the range of zero to Log 2_diff_max_min_luma_coding_block_size. The value of the depth flag diff_cu_qp_delta_depth is inferred to 0 if this depth flag is not present, and when the depth flag is 0, the minimum block size for delta QP signaling is equal to the luma CTB size. Log 2diff_max_min_luma_coding_block_size specifies the difference in depth between the maximum and minimum luma CB size, and when the depth flag is equal to Log 2diff_max_min_luma_coding_block_size, the minimum block size for delta QP signaling is equal to the minimum luma CB size. The encoder incorporates the delta QP information for a current CB in a video bitstream if the current CB size is greater than or equal to the minimum block size for delta QP signaling. The decoder determines the minimum block size for delta QP signaling based on the value of the depth flag diff_cu_qp_delta_depth, and for decoding each CB, the decoder parses the delta QP information from the video bitstream if the CB size is larger than or equal to the minimum block size for delta QP signaling.

Syntax elements cu_qp_delta_abs and cu_qp_delta_sign_flag are incorporated in the video bitstream at the TU level if the enable flag cu_qp_delta_enabled_flag indicates enabled and a check flag IsCuQpDeltaCoded indicates zero. The check flag IsCuQpDeltaCoded is set to zero when coding a CU if both the enable flag cu_qp_delta_enabled_flag indicates enabled and the log 2 of a current CB size is greater than or equal to a variable Log 2MinCuQpDeltaSize. The variable Log 2MinCuQpDeltaSize is derived by a difference between CtbLog 2SizeY and the depth flag diff_cu_qp_delta_depth, where CtbLog 2SizeY is the log 2 of the size of the luma CTB, for example, if the luma CTB size is 64, CtbLog 2SizeY=6.

A final QP for a current CB is derived based on a signaled delta QP for the current CB and a reference QP, where the reference QP derivation is based on QP of neighboring coded quantization groups of the current CB. A quantization group is a basic unit for sharing the QP information. The neighboring coded quantization groups include an above neighboring coded quantization group having a QP value qP_A and a left neighboring coded quantization group having a QP value qP_L. The reference QP is equal to (qP_L+qP_A+1)>>1. If qP_A or qP_L is unavailable, a QP value qP_prev is used instead, where qP_prev is the QP value of a previous quantization group in decoding order. If this qP_prev is also unavailable, a slice QP value is used instead.

In the HEVC standard range extension, chroma QP offset signaling is controlled by two flags, chroma enable flag cu_chroma_qp_offset_enabled_flag and chroma offset size flag Log 2MinCuChromaQpOffsetSize, where the chroma enable flag indicates whether chroma QP offset signaling is enabled or disabled, and the chroma offset size flag is used to set the minimum size for chroma QP offset signaling. The chroma offset size variable Log 2MinCuChromaQpOffsetSize is derived by a difference between CtbLog 2SizeY and a chroma depth flag diff_cu_chroma_qp_offset_depth, where the chroma depth flag specifies a difference between the luma CTB size and a minimum luma CB size of coding units that convey the chroma QP offset. Syntax elements cu_chroma_qp_offset_flag and cu_chroma_qp_offset_idx associated with the chroma QP offset are incorporated in the video bitstream at the TU level if the chroma enable flag cu_chroma_qp_offset_enabled_flag and a cbf flag cbfChroma both indicate one, and a bypass flag cu_transquant_bypass and a check flag IsCuChromaQpOffsetCoded both indicate zero. The check flag IsCuChromaQpOffsetCoded is set to zero when coding a CU if both the chroma enable flag cu_chroma_qp_offset_enabled_flag indicates enabled and the log 2 of a current CB size is greater than or equal to the chroma offset size variable Log 2MinCuChromaQpOffsetSize.

The shape of a coding block (CB) in HEVC is always square after quad-tree partitioning, since the block width of the CB is equal to the block height of the CB, the minimum block size for conveying delta QP or chroma QP offset is determined by a one-dimensional measure such as a depth value or a width value. In an example, when a luma CTB size is 64×64, a depth value of 0 indicates the minimum block size for QP information signaling is 64×64, a depth value of 1 indicates the minimum block size for QP information signaling is 32×32, and a depth value of 2 indicates the minimum block size for QP information signaling is 16×16. However, the partitioned blocks of other partitioning methods such as the binary-tree, QTBT, and triple-tree partitioning methods are not all square blocks. The present application describes various video data processing methods with conditioned QP information signaling for both square and non-square coding blocks. The partitioning method for splitting the coding blocks may be quad-tree, binary-tree, triple-tree, a restricted partitioning method including certain split types in a partitioning method, or a combined partitioning method combining multiple partitioning methods such as QTBT.

QP information signaling conditioned by the area of a block In some embodiments of the present invention, rather than using the one-dimensional measure such as a partition depth value or a block width to determine the minimum block size for QP information signaling, a two-dimensional measure such as an area of the block is used. The QP information such as the delta QP or the chroma QP offset is only transmitted for coding blocks greater than or equal to a QP minimum block area. According to an implementation of an embodiment, a variable MinCuQpDeltaArea or Log 2MinCuQpDeltaArea, is defined to represent the QP minimum block area for conveying the delta QP information. The variable MinCuQpDeltaArea or Log 2MinCuQpDeltaArea may be transmitted at high level syntax in the video bitstream or may be derived from one or more other syntax elements. The check flag IsCuQpDeltaCoded is set to zero when coding a current CU if both the enable flag cu_qp_delta_enabled_flag shows QP information signaling is enabled for the current CU and a block area of a current luma CB is greater than or equal to the variable MinCuQpDeltaArea representing the QP minimum block area. The block area is calculated by multiplying a block width CbWidth and a block height CbHeight of the current luma CB. The following pseudo codes illustrate the conditions required to set the check flag:

```
if ( cu_qp_delta_enabled flag && CbWidth * CbHeight >=
MinCuQpDeltaArea ) {
    IsCuQpDeltaCoded = 0
    CuQpDeltaVal = 0
}.
```

The variable CuQpDeltaVal specifies the difference between a luma quantization parameter for the coding unit containing cu_qp_delta_abs and its prediction. If cu_qu_delta_abs is presented, CuQpDeltaVal=cu_qp_delta_abs*(1−2*cu_qp_delta_sign_flag).

Syntax elements associated with the QP information such as the syntax elements representing the delta QP absolute value cu_qu_delta_abs and delta QP sign flag cu_qp_delta_sign_flag are signaled for the current coding block if the check flag IsCuQpDeltaCoded is zero. In one embodiment, the syntax elements associated with the QP information are signaled for the current coding block if the check flag for the current coding block is zero and the enabled flag for the current coding block indicates delta QP signaling is enabled. The check flag is set to one after the syntax elements associated with the QP information are signaled.

The general rule for signaling the QP information is described as follows. For a coding block that has an area larger than or equal to the QP minimum block area, QP information such as the delta QP or QP offset is signaled for the coding block. For a group of coding blocks that each has an individual area smaller than the QP minimum block area, but a total area of the coding blocks in the group is larger than or equal to the QP minimum block area, shared QP information is transmitted or derived for the multiple coding blocks to share the shared QP information. The group of coding blocks sharing the shared QP information is also called a quantization group in this disclosure.

In some embodiment, shared QP information sharing by a group of CBs is used for a current CB if the area of the current CB is smaller than the QP minimum block area. Rather than signaling individual QP information for each CB in the group, all the CBs in the group reuse the shared QP information. A total area of the group sharing the shared QP information is larger than or equal to the QP minimum block area. In one embodiment, the shared QP information is incorporated in the video bitstream or is parsed from the video bitstream when processing a first coded CB in a quantization group that has at least one non-zero residual transform coefficient. The first coded CB is the first processed CB in the quantization group sharing the shared QP information according to an encoding order or a decoding order. The subsequent CBs in the quantization group coded following the first CB reuse the shared QP information determined from the first coded CB. It is not necessary to signal QP information when all residual transform coefficients in a quantization group are zeros. For example, QP information for a quantization group is not incorporated in the video bitstream nor parsed from the video bitstream if coded block flag cbf is zero. In a case when all the CBs in the quantization group do not have any non-zero residual transform coefficient, the QP information such as a delta QP is not signaled in the video bitstream. The delta QP may be inferred to be zero when signaling of the delta QP for the quantization group is omitted. A QP for this quantization group is set to equal to a reference QP, and although this QP is not used for quantizing a residual signal of the current quantization group, it can be referred by a subsequent quantization group. In some other embodiments, the shared QP information is derived from a reference QP, a default QP, or a previous QP.

Alternatively, when the Log 2 variable Log 2MinCuQpDeltaArea is used to compare with the block area of the current luma CB, the block area is calculated by summing the Log 2 value of the block width and the Log 2 value of the block height of the current luma CB. The following pseudo codes illustrate the conditions required to set the check flag:

```
if ( cu_qp_delta_enabled_flag && (Log2CbWidth + Log2CbHeight) >=
Log2MinCuQpDeltaArea)
{
    IsCuQpDeltaCoded = 0
    CuQpDeltaVal = 0
}.
```

Similarly, a variable MinCuChromaQpOffsetArea or Log 2MinCuChromaQpOffsetArea, is defined to represent the minimum block area for conveying the chroma QP information. The check flag IsCuChromaQpOffsetCoded is set to zero when coding the current CU if both the enable flag cu_chroma_qp_offset_enabled_flag indicates chroma QP information signaling is enabled and a block area of a current chroma CB is greater than or equal to the variable MinCuChromaQpOffsetArea. The block area of the current chroma CB is calculated by multiplying a block width and a block height of the current chroma CB. The chroma check flag may be set according to the following condition:

```
if (cu_chroma_qp_offset_enabled_flag && CbWidth * CbHeight >=
MinCuChromaQpOffsetArea)
{
    IsCuChromaQpOffsetCoded = 0
}.
```

Syntax elements associated with the chroma QP information such as the syntax elements representing the chroma QP offset or the chroma QP delta are signaled for the current coding block if the check flag IsCuChromaQpOffsetCoded is zero. In one embodiment, the syntax elements associated with the chroma QP information are signaled for the current coding block if the check flag for the current coding block is zero and the enabled flag for the current coding block indicates chroma QP information signaling is enabled. The check flag is set to one after the syntax elements are signaled.

Alternatively, when the Log 2 variable Log 2MinCuChromaQpOffsetArea is used to compare with the block area of the current chroma CB, the block area is calculated by summing the Log 2 value of the block width and the Log 2 value of the block height of the current chroma CB. The chroma check flag may be set according to the following condition:

```
if(cu_chroma_qp_offset_enabled_flag && Log2CbWidth +
   Log2CbHeight >= Log2MinCuChromaQpOffsetArea) {
     IsCuChromaQpOffsetCoded = 0
}.
```

The following equations show an example of deriving the variables representing the QP minimum block area for the luma and chroma components. The variable Log 2MinCuQpDeltaArea includes calculating a difference between CtbLog 2SizeY and the depth flag diff_cu_qp_delta_depth and then times by two. An example of deriving the variable Log 2MinCuChromaQpOffsetArea includes calculating a difference between CtbLog 2SizeY and the chroma depth flag diff_cu_chroma_qp_offset_depth and then times by two.

Log 2MinCuQpDeltaArea=2*(CtbLog 2SizeY−diff_cu_qp_delta_depth)

Log 2MinCuChromaQpOffsetArea=2*(CtbLog 2SizeY−diff_cu_chroma_qp_offset_depth)

Figure 7A:
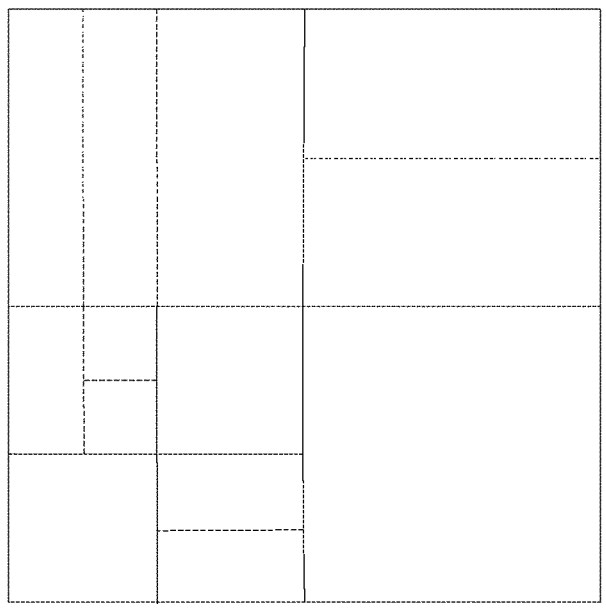
FIG. 7A illustrates an exemplary block partitioning structure for splitting a 64×64 coding tree block into multiple coding blocks according to a QTBT partitioning method.
Figure 7B:
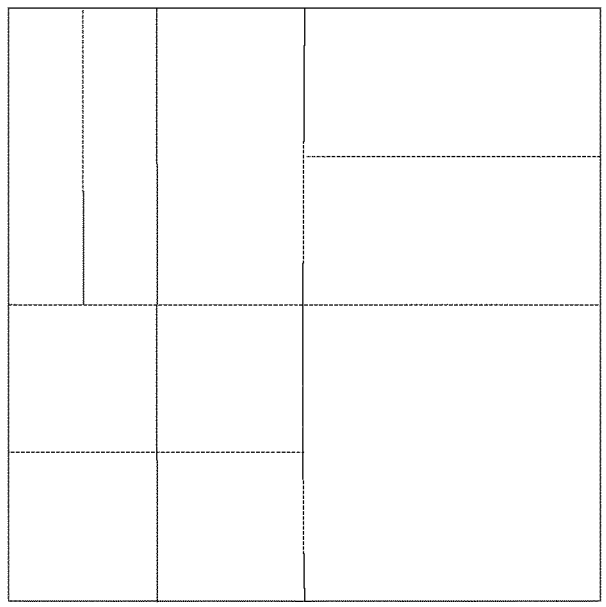
FIG. 7B illustrates quantization groups corresponding to the 64×64 coding tree block in FIG. 7A when the QP minimum block area is 256 pixels according to an embodiment of the present invention.

FIG. 7A illustrates an exemplary block partitioning structure for splitting a 64×64 coding tree block into multiple coding blocks according to the QTBT partitioning method. The solid lines in FIG. 7A are block boundaries after quad-tree partitioning and the dotted lines in FIG. 7A are block boundaries after binary-tree partitioning. FIG. 7B illustrates quantization groups corresponding to the 64×64 coding tree block in FIG. 7A when the QP minimum block area for QP information signaling is 256 pixels (i.e. 16×16) according to an embodiment of the present invention, where same QP information is shared by one or more coding blocks in each quantization group. In FIG. 7B, some quantization groups contain more than one coding blocks if the block area of each coding block in these quantization groups is smaller than 256 pixels. The coding blocks in a quantization group share same QP information transmitted in the video bitstream, and no individual QP information is transmitted for each coding block in the quantization group.

If the area of the current CB is larger than or equal to the QP minimum block area, QP information for the current CB is incorporated in a video bitstream in the encoder side, or the QP information for the current CB is parsed from the video bitstream in the decoder side. If the area of the current CB is smaller than the QP minimum block area, the QP information for the current CB is derived from shared QP information. For example, the shared QP information is incorporated in the video bitstream or parsed from the video bitstream when processing a first coded CB or a last coded CB of a group of CBs sharing the shared QP information. The first coded CB is coded before other CBs in the group according to the encoding or decoding order while the last coded CB is coded after all other CBs in the group according to the encoding or decoding order. The shared QP information in some embodiments is signaled in a CB that has at least one non-zero residual transform coefficient, for example, the shared QP information is signaled in the first CB which contains at least one non-zero residual transform coefficient. A total area of the group of CB sharing the shared QP information is greater than or equal to the QP minimum block area. There is no individual QP information signaled in the bitstream for CBs having an area smaller than the QP minimum block area. In one embodiment, the current CB reuses the shared QP information signaled for a previously coded CB which is positioned above the current CB or on the left of the current CB, and a total area of these two CBs is equal to the QP minimum block area.

QP information signaling conditioned by the combined depth of a block Some embodiments of the video data processing methods with conditional QP information signaling define the minimum block size for conveying QP information based on a combined depth when the partitioning structure combines two or more partitioning methods such as the QTBT partitioning method. In an embodiment, for blocks partitioned by the QTBT partitioning method, whether QP information is signaled for a CB is determined by a combined depth derived by the quad-tree depth and binary-tree depth of the CB. An example of the combined depth is calculated by adding the quad-tree depth to a half of the binary-tree depth. The QP information for a coding block is signaled when the calculated combined depth is less than or equal to a depth flag diff_cu_qp_delta_depth. In this embodiment, the check flag IsCuQpDeltaCoded is set if the enable flag cu_qp_delta_enabled_flag indicates QP information signaling is enable and the combined depth is less than or equal to the depth flag diff_cu_qp_delta_depth as shown in the following:

```
if( cu_qp_delta_enabled_flag && quadTreeDepth +
    (binaryTreeDepth>>1) <= diff_cu_qp_delta_depth) {
      IsCuQpDeltaCoded = 0
      CuQpDeltaVal = 0
}, where quadTreeDepth is the quad-tree depth of the CB and
binaryTreeDepth is the binary-tree depth of the CB.
```

The depth flag diff_cu_qp_delta_depth specifies the difference in depth values between a largest coding block size such as a CTB size and a minimum block size for conveying QP information. The decoder determines the minimum block size for QP information signaling from the CTB size according to the depth flag. The value of the depth flag diff_cu_qp_delta_depth may be inferred to zero if this depth flag is not present, and when the depth flag is zero, the minimum block size for QP information signaling is equal to the CTB size. The minimum block size for QP information signaling is equal to the minimum CB size when the value of the depth flag diff_cu_qp_delta_depth is the maximum value in the valid range.

The chroma check flag IsCuChromaQpOffsetCoded is set if the chroma enable flag cu_chroma_qp_offset_enabled_flag indicates chroma QP information signaling is enabled and the combined depth is less than or equal to the chroma depth flag diff_cu_chroma_qp_offset_depth as shown in the following:

```
if(cu_chroma_qp_offset_enabled_flag && quadTreeDepth +
   (binaryTreeDepth>>1) <= diff_cu_chroma_qp_offset_depth) {
     IsCuChromaQpOffsetCoded = 0
}.
```

In another example, the combined depth is calculated by the following equation:

$$quadTreeDepth+((binaryTreeDepth+1)>>1)$$

In a variation of the previous described embodiment, the combined depth is calculated by summing double of the quad-tree depth and the binary-tree depth, and this combined depth is compared with double the depth flag. The following pseudo codes demonstrates this example:

```
if( cu_qp_delta_enabled_flag && 2*quadTreeDepth +
binaryTreeDepth <= 2*diff_cu_qp_delta_depth) {
    IsCuQpDeltaCoded = 0
    CuQpDeltaVal = 0
};
if(cu_chroma_qp_offset_enabled_flag && 2*quadTreeDepth +
binaryTreeDepth <= 2*diff_cu_chroma_qp_offset_depth) {
    IsCuChromaQpOffsetCoded = 0
}.
```

The above embodiments of QP information signaling conditioned by the combined depth only describe the case for blocks partitioned according to the QTBT partitioning method, however, the QP information signaling method is not restricted to the QTBT partitioning method. The QP information signaling method conditioned by the combined depth may apply to blocks split by any combined partitioning method combining two or more partitioning methods. In another embodiment, a combined depth is calculated based on a first partitioning depth of a first partitioning method and a second partitioning depth of a second partitioning method. Different weighting may be applied to the partitioning depths of different partitioning methods when calculating the combined depth. For a combined partitioning method splits blocks using the quad-tree partitioning method then the triple-tree partitioning method, the combined depth is calculated based on a quad-tree depth and a triple-tree depth. The weighting for calculating the combined depth may be 1 for the quad-tree depth and ¾ for the triple-tree depth.

Figure 8A:
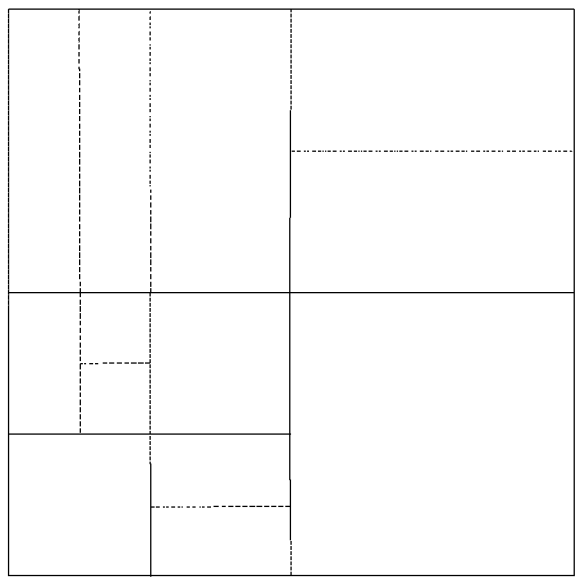
FIG. 8A illustrates an example of block partitioning structure according to a QTBT partitioning method.
Figure 8B:
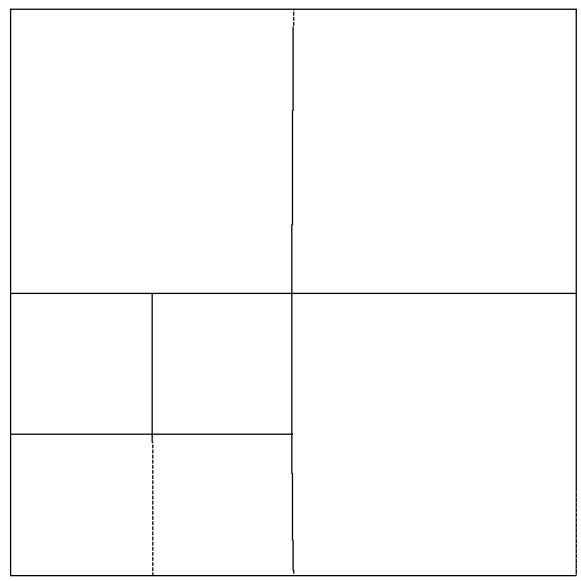
FIG. 8B illustrates the corresponding quad-tree leaf blocks of FIG. 8A, where QP information are signaled for each quad-tree leaf block according to an embodiment of the present invention.

QP information signaling at quad-tree leaf block Some embodiments of the video data processing methods with conditioned QP information signaling set a constraint that the unit of QP information signaling is the quad-tree leaf block in a QTBT block partitioning structure. The QTBT partitioning method first splits the block recursively according to quad-tree partitioning, then binary-tree partitioning starts from the quad-tree leaf blocks. FIG. 8A shows an example of block partitioning structure according to the QTBT partitioning method, where the solid lines are quad-tree partition boundaries and the dotted lines are binary-tree partition boundaries. FIG. 8B shows the corresponding quad-tree leaf blocks of FIG. 8A, where QP information such as a delta QP for a luma block or chroma block, or a QP offset for a luma block or chroma block are signaled for each quad-tree leaf block, and one or more binary-tree coding blocks in each quad-tree leaf block share the same QP information. This QP information signaling method may also be applied to other partitioning methods that split blocks according to two or more partitioning methods one after another. For example, a partitioning method first splits the block recursively according to a first partitioning method and then a second partitioning method starts from leaf blocks of the first partitioning method. The QP information signaling method sets the leaf block of the first partitioning method as the unit of QP information signaling, and all smaller blocks split by the second partitioning method in the leaf block of the first partitioning method share the same QP information.

Separate block partitioning structures for luma and chroma components In HEVC, the block partitioning structure is the same for luma and chroma components unless the block partitioning structure results in one or more chroma blocks smaller than a minimum chroma coding block size. Delta QPs are only signaled for the luma component while a QP for a chroma block is derived according to the delta QP signaled for a co-located luma block and a chroma QP offset. Some embodiments of the present invention allow separate block partitioning structures for the luma and chroma components to provide more flexibility for coding the chroma components. In one embodiment, two separate depth flags for the luma and chroma components are signaled, and in another embodiment, the same depth flag is shared between the luma and chroma components. In yet another embodiment, a depth flag diff_cu_qp_delta_depth_c for the chroma component is set as a value depending on a depth flag diff_cu_qp_delta_depth for the luma component. For example, the value of the depth flag for the chroma component is derived by the depth flag for the luma component minus n, where n is an integer greater than zero. The depth flag diff_cu_qp_delta_depth_c for the chroma component may be signaled to specify the difference between the chroma coding tree block (CTB) size and the minimum chroma coding block (CB) size for conveying the QP information including the absolute value of delta QP cu_qp_delta_abs and the sign of delta QP cu_qp_delta_sign_flag for the chroma components. The value of this depth flag diff_cu_qp_delta_depth_c is restricted in the range of zero to a Log 2 value of a difference between maximum and minimum coding block size Log 2diff_max_min_luma_coding_block_size inclusive. The default value of the depth flag diff_cu_qp_delta_depth_c may be inferred to be zero when this depth flag is not present.

Two delta QPs may be signaled for the luma and chroma components respectively when the block partitioning structures for the luma and chroma components are separately determined. The syntax element for determining the minimum block sizes for delta QP signaling such as MinCuQpDeltaArea, Log 2MinCuQpDeltaArea, or Log 2 MinCuQpDeltaSize, may also be separately coded for the luma and chroma components in the sequence level, picture level, or slice level. The chroma delta QP in some embodiments may be predicted from the delta QP or the final QP of a co-located luma block.

The QP minimum block area for a chroma component in some embodiments is determined from the QP minimum block area for a luma component. A flag in one embodiment is signaled to indicate whether the syntax element, such as MinCuQpDeltaAreaC or Log 2MinCuQpDeltaAreaC, for determining the minimum chroma block size for delta QP signaling, is determined according to the same ratio as a color sampling ratio for sampling the luma and chroma components. For example, for a 4:2:0 sampling format, the flag is used to indicate whether the value of the syntax element for the chroma component MinCuQpDeltaAreaC is one-quarter of the value indicated in the syntax element MinCuQpDeltaArea for the luma component. If the syntax elements are represented in Log 2 value, the flag is used to indicate whether the value of the syntax element for the chroma component Log 2MinCuQpDeltaAreaC is equal to the value of the syntax element for the luma component minus two (i.e. Log 2MinCuQpDeltaArea−2).

In one embodiment, three delta QPs are separately signaled for the three color components when more than one color component is coded, for example, when the syntax element ChromaArrayType is greater than zero, a delta QP is signaled for each of luma component Y, chroma components Cb and Cr respectively. In this embodiment, the delta QP information for luma and chroma components are signaled separately and signaling of chroma QP offsets is omitted for the chroma components.

Another embodiment reuses the luma delta QP for the chroma components when separating block partitioning structures are used for luma and chroma components. In this embodiment, only one delta QP is signaled for the luma component as the chroma delta QP of a chroma block is derived from the delta QP of a co-located luma block and a chroma QP offset, the chroma QP offset is also signaled. The syntax elements representing the chroma QP offset signaled in the video bitstream may include chroma QP offset flag cu_chroma_qp_offset_flag and chroma QP offset index cu_chroma_qp_offset_idx. A reuse flag indicating whether the delta QPs are reused by the chroma components may be signaled at the sequence level, picture level, or slice level to adaptively enable or disable the reuse of delta QPs. Two or more delta QPs are signaled for the luma and chroma components if the reuse flag indicates reuse of delta QPs is disabled.

Figure 9:
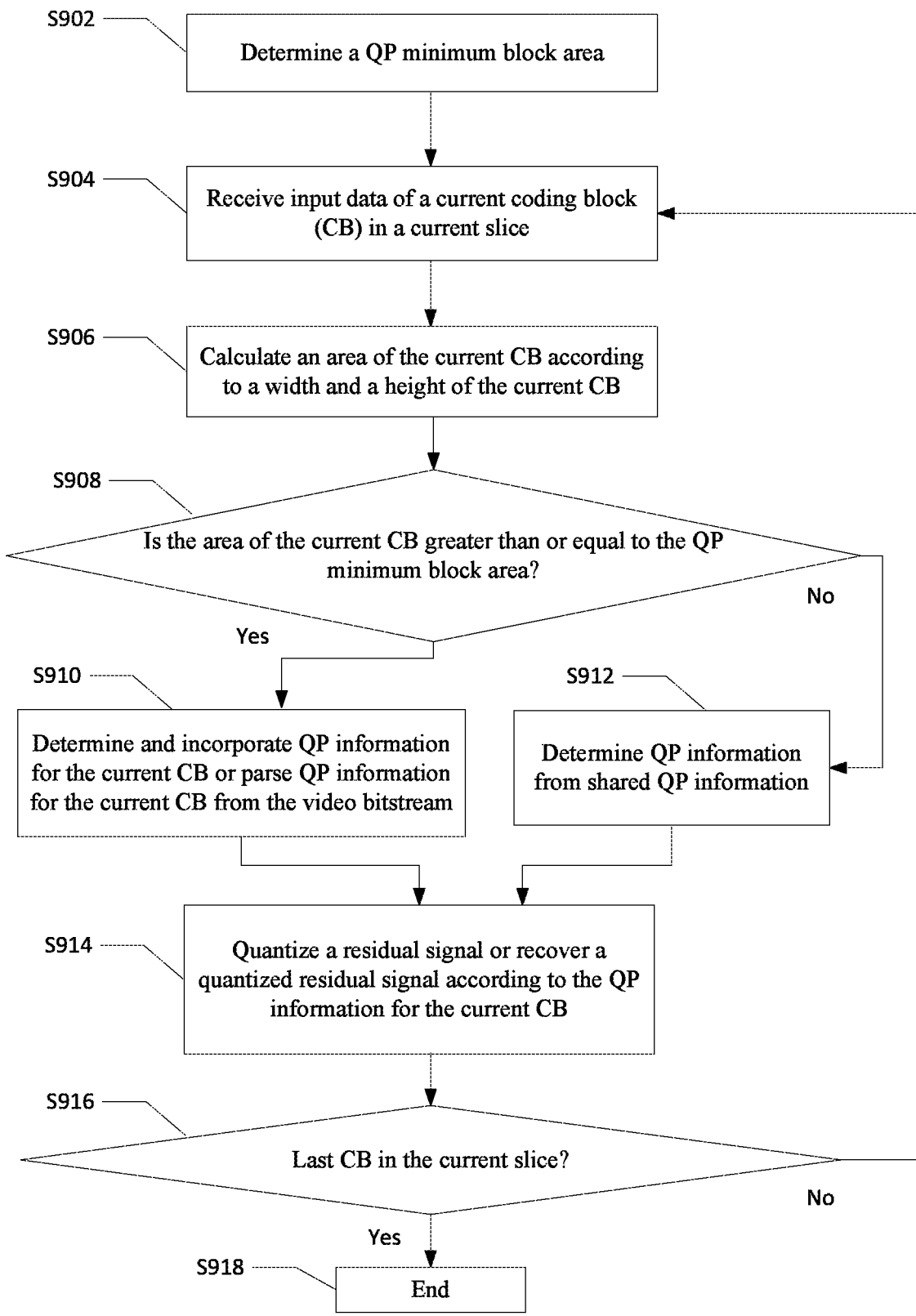
FIG. 9 is a flowchart illustrating an exemplary video data processing method according to an embodiment of the present invention.

FIG. 9 is a flow chart illustrating an embodiment of the video data processing method with QP information conditionally signaled according to a comparing result of areas. The video data processing method described in FIG. 9 may be applied to one or more of the luma component and chroma components. A QP minimum block area is determined in step S902, for example, derived from one or more syntax elements signaled in a video bitstream. Input data of a current CB in a current slice is received in step S904, and an area of the current CB is calculated according to a width and a height of the current CB in step S906. In step 908, the area of the current CB is compared with the QP minimum block area and if the area of the current CB is greater than or equal to the QP minimum block area, the video data processing method proceeds to step S910, else the video data processing method proceeds to step S912. QP information for the current CB is determined and incorporated in the video bitstream or parsed from the video bitstream in step S910, whereas the QP information for the current CB is derived from shared QP information in step S912. A group of CBs including the current CB shares the shared QP information as no individual QP information is signaled for the current CB in step S912. The QP information for the current CB is then used to quantize a residual signal or recover a quantized residual signal in step S914. Step S916 checks if the current CB is the last CB in the current slice, and if the current CB is not the last CB, the video data processing method repeats step S904 to step S916; else the video data processing ends the quantization or inverse quantization of the current slice in step S918. According to some embodiments, the comparing step S908 may also determine whether there is any non-zero residual transform coefficient in the current CB, and the encoder or decoder only proceeds to step S910 or step S912 when at least one non-zero residual transform coefficient is existed in the current CB. If there is no non-zero residual transform coefficient in the current CB, which means all the coefficients are zeros, signaling of QP information for the current CB is not needed as the quantization or inverse quantization of the current CB may be skipped.

Figure 10:
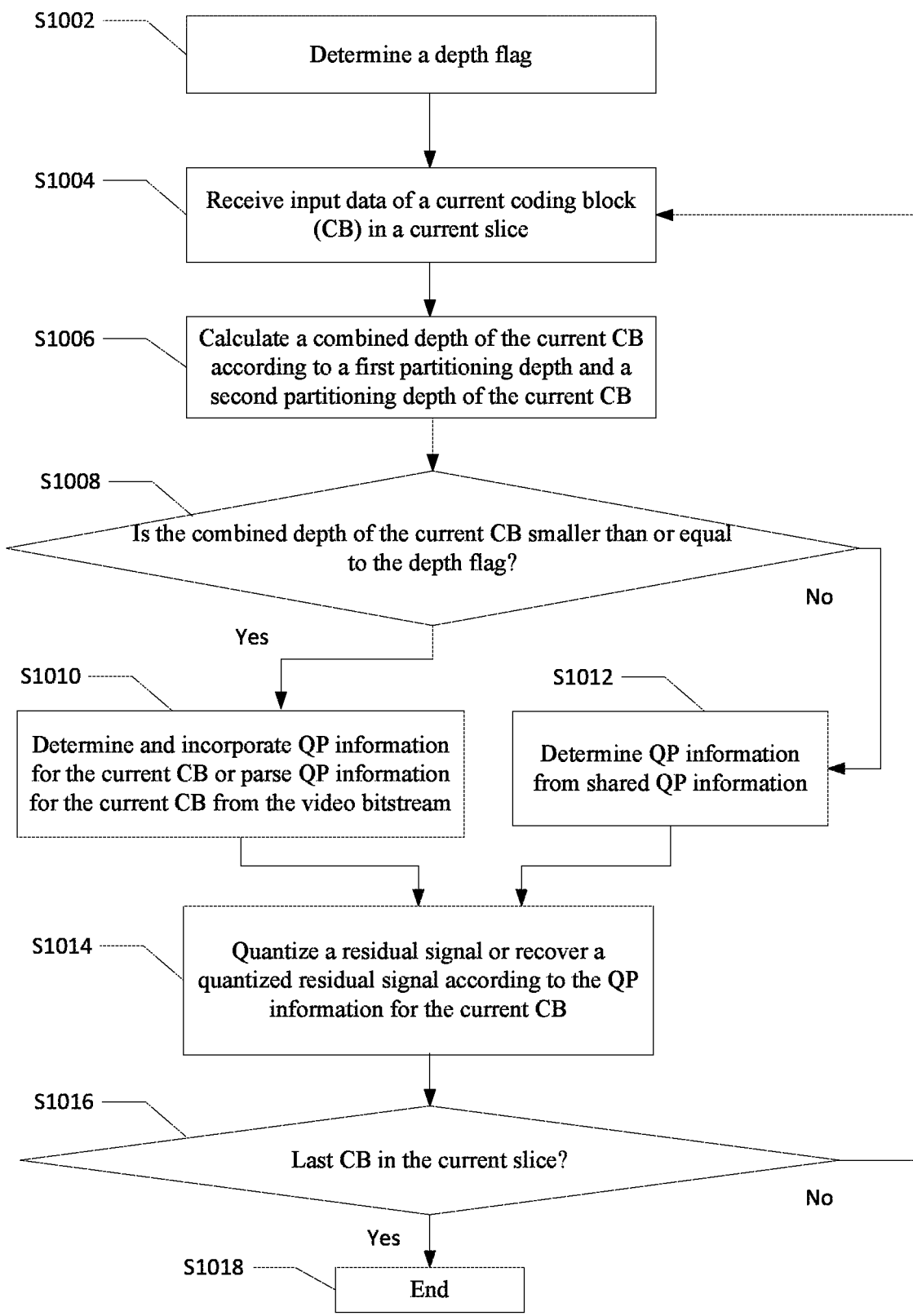
FIG. 10 is a flowchart illustrating an exemplary video data processing method according to another embodiment of the present invention.

FIG. 10 is a flow chart illustrating an exemplary video data processing method according to another embodiment of the present invention. Instead of comparing the areas, the embodiment shown in FIG. 10 compares a combined depth with a depth flag. The video data processing method illustrated in FIG. 10 may also be applied to one or more of the luma component and chroma components. In the flow chart, the depth flag is determined in step S1002, for example, the depth flag is derived from one or more syntax element signaled in a video bitstream. Input data of a current CB in a current slice is received in step S1004. A combined depth of the current CB is calculated in step S1006, where the combined depth is calculated according to a first partitioning depth and a second partitioning depth. The CBs in the current slice are partitioned according to a combined partitioning method which first partitioned using a first partitioning method then a second partitioning method. Step S1008 checks if the combined depth of the current CB is smaller than or equal to the depth flag, and if yes, the video data processing proceeds to step 1010, else to step 1012. QP information for the current CB is determined and incorporated in the video bitstream or parsed from the video bitstream in step S1010; whereas the QP information for the current CB is determined from shared QP information in step S1012. The QP information determined from step S1010 or S1012 is used to quantize a residual signal or recover a quantized residual signal in step S1014. Step S1016 checks if the current CB the last CB in the current slice, and the video data processing method repeats step S1004 to step S1016 if the current CB is not the last CB in the current slice, else the quantization or inverse quantization process for the current slice ends in step S1018. Similar to FIG. 9, the comparing step S1008 may further determine whether there is any non-zero residual transform coefficient in the current CB, and QP information determination or signaling in step S1010 or step S1012 is only performed when there is at least one non-zero residual transform coefficient in the current CB. When all the residual transform coefficients in the current CB are zeros, QP information signaling is not needed as the quantization or inverse quantization of the current CB is skipped.

Figure 11:
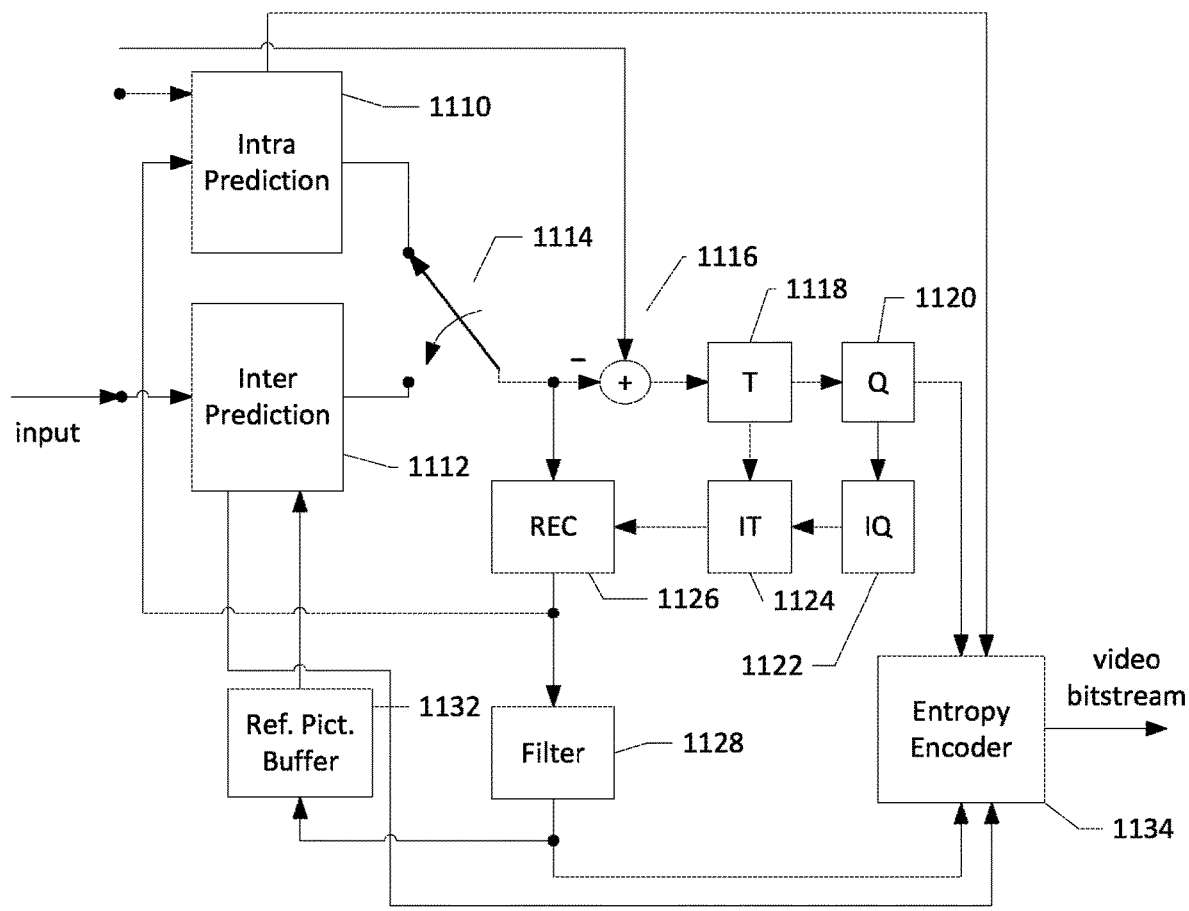
FIG. 11 illustrates an exemplary system block diagram for a video encoding system incorporating the video data processing method according to embodiments of the present invention.

FIG. 11 illustrates an exemplary system block diagram for a Video Encoder 1100 implementing embodiments of the present invention. Intra Prediction 1110 provides intra predictors based on reconstructed video data of a current picture. Inter Prediction 1112 performs motion estimation (ME) and motion compensation (MC) to provide predictors based on video data from other picture or pictures. Either Intra Prediction 1110 or Inter Prediction 1112 supplies the selected predictor to Adder 1116 to form prediction errors, also called residues. The residues of the current block are further processed by Transformation (T) 1118 followed by Quantization (Q) 1120. The transformed and quantized residual signal is then encoded by Entropy Encoder 1134 to form a video bitstream. In Q 1120, QP information for a current CB is determined and conditionally signaled in the video bitstream according to a comparing result of areas or a comparing result of depths. Individual QP information for the current CB is determined and signaled in the video bitstream if the area of the current CB is larger than or equal to a minimum QP block area according to an embodiment. Individual QP information for the current CB is determined and signaled in the video bitstream if a combined depth of the current CB is smaller than or equal to a depth flag according to another embodiment. The video bitstream is then packed with side information including the QP information. The transformed and quantized residual signal of the current block is processed by Inverse Quantization (IQ) 1122 and Inverse Transformation (IT) 1124 to recover the prediction residues. According to embodiments of the present invention, the QP information for the current CB is also used to recover the quantized residual signal in IQ 1122. As shown in FIG. 11, the residues are recovered by adding back to the selected predictor at Reconstruction (REC) 1126 to produce reconstructed video data. The reconstructed video data may be stored in Reference Picture Buffer (Ref. Pict. Buffer) 1132 and used for prediction of other pictures. The reconstructed video data from REC 1126 may be subject to various impairments due to the encoding processing, consequently, In-loop Processing Filter 1128 is applied to the reconstructed video data before storing in the Reference Picture Buffer 1132 to further enhance picture quality. Syntax elements associated with the QP information are provided to Entropy Encoder 1134 for incorporation into the video bitstream.

Figure 12:
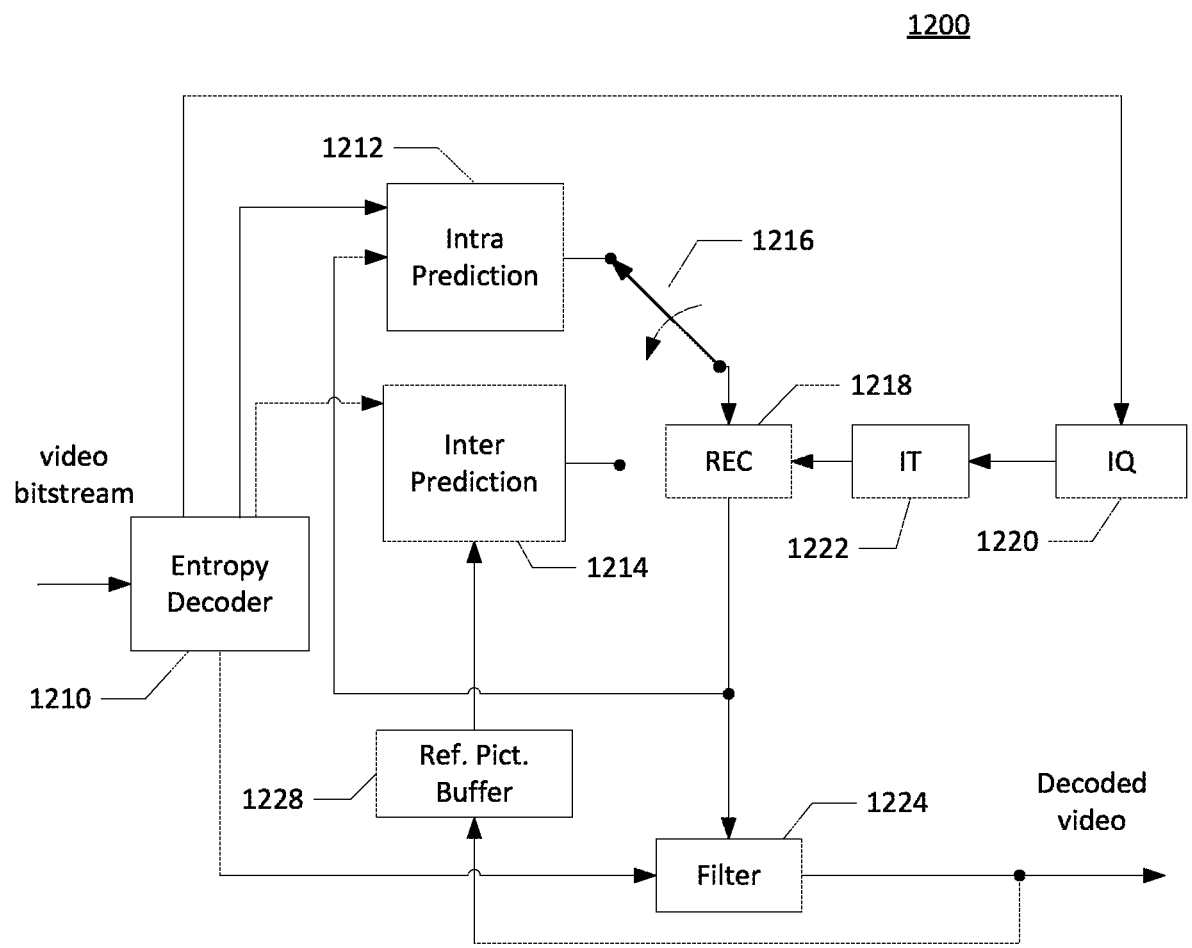
FIG. 12 illustrates an exemplary system block diagram for a video decoding system incorporating the video data processing method according to embodiments of the present invention.

A corresponding Video Decoder 1200 for Video Encoder 110 of FIG. 11 is shown in FIG. 12. The video bitstream encoded by a video encoder is the input to Video Decoder 1200 and is decoded by Entropy Decoder 1210 to parse and recover the transformed and quantized residual signal and other system information. Entropy Decoder 1210 parses QP information for a current CB if an area of the current CB is larger than or equal to the minimum QP block area according to one embodiment. According to another embodiment, Entropy Decoder 1210 parses QP information for a current CB if a combined depth of the current CB is smaller than or equal to a depth flag. The decoding process of Decoder 1200 is similar to the reconstruction loop at Encoder 1100, except Decoder 1200 only requires motion compensation prediction in Inter Prediction 1214. Each block is decoded by either Intra Prediction 1212 or Inter Prediction 1214. Switch 1216 selects an intra predictor from Intra Prediction 1212 or Inter predictor from Inter Prediction 1214 according to decoded mode information. The transformed and quantized residual signal associated with each block is recovered by Inverse Quantization (IQ) 1220 and Inverse Transformation (IT) 1222. IQ 1220 recovers the quantized residual signal according to the QP information parsed by Entropy Decoder 1210. The recovered residual signal is reconstructed by adding back the predictor in REC 1218 to produce reconstructed video. The reconstructed video is further processed by In-loop Processing Filter (Filter) 1224 to generate final decoded video. If the currently decoded picture is a reference picture, the reconstructed video of the currently decoded picture is also stored in Ref. Pict. Buffer 1228 for later pictures in decoding order.

Various components of Video Encoder 1100 and Video Decoder 1200 in FIG. 11 and FIG. 12 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 1100 and Decoder 1200, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 11 and 12, Encoder 1100 and Decoder 1200 may be implemented in the same electronic device, so various functional components of Encoder 1100 and Decoder 1200 may be shared or reused if implemented in the same electronic device. For example, one or more of Reconstruction 1126, Inverse Transformation 1124, Inverse Quantization 1122, In-loop Processing Filter 1128, and Reference Picture Buffer 1132 in FIG. 11 may also be used to function as Reconstruction 1218, Inverse Transformation 1222, Inverse Quantization 1220, In-loop Processing Filter 1224, and Reference Picture Buffer 1228 in FIG. 12, respectively.

Embodiments of the video data processing method with conditioned QP information signaling for video coding system may be implemented in a circuit integrated into a video compression chip or program code integrated into video compression software to perform the processing described above. For examples, determining of a current mode set for the current block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data of slices in a video coding system, wherein video data of a color component in each slice is partitioned into Coding Blocks (CBs) according to a combined partitioning method, and the combined partitioning method partitions the video data according to a first partitioning method then a second partitioning method, comprising:

receiving input data associated with a current CB in a current slice;

determining a depth flag, wherein signaling of Quantization Parameter (QP) information for each CB in the current slice is conditioned by a comparing result of depths;

calculating a combined depth of the current CB according to a first partitioning depth and a second partitioning depth of the current CB, wherein the first partitioning depth corresponds to the first partitioning method and the second partitioning depth corresponds to the second partitioning method;

comparing the combined depth of the current CB with the depth flag;

determining and incorporating QP information for the current CB in a video bitstream or parsing the QP information for the current CB from the video bitstream if the combined depth of the current CB is smaller than or equal to the depth flag; and quantizing a residual signal of the current CB or recovering a quantized residual signal of the current CB according to the QP information for the current CB.

2. The method of claim 1, wherein the combined depth is calculated according to a weighted sum of the first partitioning depth and the second partitioning depth.

3. The method of claim 2, wherein the combined partitioning method is Quad-Tree-plus-Binary-Tree (QTBT) partitioning method, the first partitioning depth is quad-tree depth of the current CB, the second partitioning depth is binary-tree depth of the current CB, and the combined depth is calculated by adding the quad-tree depth to a half of the binary-tree depth of the current CB.

4. The method of claim 1, wherein the depth flag specifies a difference in depth values between a Coding Tree Block (CTB) size and a minimum block size for QP information signaling.

5. The method of claim 1, wherein if the combined depth of the current CB is larger than the depth flag, the QP information for the current CB is derived from shared QP information sharing by a group of CBs, and no individual QP information is signaled in the video bitstream for each CB in the group.

6. The method of claim 5, wherein the shared QP information is incorporated in the video bitstream or parsed from the video bitstream when processing a first coded CB of the group of CBs sharing the shared QP information, and the first coded CB is first coded in the group according to an encoding or decoding order that has at least one non-zero residual transform coefficient.

7. The method of claim 1, wherein the QP information for the current CB is associated with a delta QP, a QP offset, or a final QP.

8. The method of claim 1, wherein the color component carried in the current CB is a luma component, and the method further comprises:
signaling QP information for a chroma component separately with respect to signaling QP information for the luma component if block partitioning structures for the luma component and the chroma component are separately determined.

9. The method of claim 8, wherein the QP information for the luma component is associated with delta QPs and the QP information for the chroma component is associated with chroma delta QPs.

10. The method of claim 1, wherein the color component carried in the current CB is a chroma component, and the QP information for the current CB is determined by reusing QP information for a co-located luma block of the current CB if block partitioning structures for a luma component and the chroma component are separately determined.

11. The method of claim 10, wherein a reuse flag is signaled at a sequence level, picture level, or slice level to adaptively enable or disable the reuse of QP information for the co-located luma block.

12. An apparatus of processing video data of slices in a video coding system, wherein video data of a color component in each slice is partitioned into Coding Blocks (CBs) according to a combined partitioning method, and the combined partitioning method partitions the video data according to a first partitioning method then a second partitioning method, the apparatus comprising one or more electronic circuits configured for:
receiving input data associated with a current CB in a current slice;
determining a depth flag, wherein signaling of Quantization Parameter (QP) information for each CB in the current slice is conditioned by a comparing result of depths;
calculating a combined depth of the current CB according to a first partitioning depth and a second partitioning depth of the current CB, wherein the first partitioning depth corresponds to the first partitioning method and the second partitioning depth corresponds to the second partitioning method;
comparing the combined depth of the current CB with the depth flag;
determining and incorporating QP information for the current CB in a video bitstream or parsing the QP information for the current CB from the video bitstream if the combined depth of the current CB is smaller than or equal to the depth flag; and
quantizing a residual signal of the current CB or recovering a quantized residual signal of the current CB according to the QP information for the current CB.

13. A non-transitory computer readable medium storing program instruction causing a processing circuit of an apparatus to perform video processing method, and the method comprising:
receiving input data associated with a current CB in a current slice, wherein video data of a color component in the current slice is partitioned into Coding Blocks (CBs) according to a combined partitioning method, and the combined partitioning method partitions the video data according to a first partitioning method then a second partitioning method;
determining a depth flag, wherein signaling of Quantization Parameter (QP) information for each CB in the current slice is conditioned by a comparing result of depths;
calculating a combined depth of the current CB according to a first partitioning depth and a second partitioning depth of the current CB, wherein the first partitioning depth corresponds to the first partitioning method and the second partitioning depth corresponds to the second partitioning method;
comparing the combined depth of the current CB with the depth flag;
determining and incorporating QP information for the current CB in a video bitstream or parsing the QP information for the current CB from the video bitstream if the combined depth of the current CB is smaller than or equal to the depth flag; and
quantizing a residual signal of the current CB or recovering a quantized residual signal of the current CB according to the QP information for the current CB.

* * * * *